United States Patent [19]

Picquendar

[11] 4,437,068
[45] Mar. 13, 1984

[54] FSK DEMODULATOR FOR FREQUENCY-MODULATION MODEM

[75] Inventor: Jean Edgar Picquendar, Paris, France
[73] Assignee: Thomson-CSF, Paris, France
[21] Appl. No.: 236,128
[22] Filed: Feb. 19, 1981
[51] Int. Cl.³ .................. H03D 3/00; H04L 27/14
[52] U.S. Cl. ........................ 329/105; 329/110; 375/88
[58] Field of Search .......... 329/104, 105, 110, 204, 329/205 R; 375/91, 88, 39

[56] References Cited

U.S. PATENT DOCUMENTS 3,921,075 11/1975 Denny .................................. 375/91
4,054,842 10/1977 Elliott ............................. 375/91 X

FOREIGN PATENT DOCUMENTS 2000662 of 0000 United Kingdom.

OTHER PUBLICATIONS

IEEE National Telecommunications Conference, vol. 1, 1975, (New York), D. D. Buss et al., "Communication Applications of CCD Transversal Filters", pp. 1–5.

Primary Examiner—David C. Nelms
Assistant Examiner—Edward Westin
Attorney, Agent, or Firm—Roland Plottel

[57] ABSTRACT

The demodulator comprises two parallel channels which have in each channel:
two transverse parallel filters whose weighting coefficients are $\cos(\omega p \tau)$ and $\sin(\omega p \tau)$ with for one channel $\omega = \omega_Z = 2\pi F_Z$, and for the other channel $\omega = \omega_A = 2\pi F_A$; and
a device ensuring the squaring of the signal from each filter.

11 Claims, 4 Drawing Figures

FSK DEMODULATOR FOR FREQUENCY-MODULATION MODEM

BACKGROUND OF THE INVENTION

The present invention relates to a FSK demodulator for a frequency-modulation modem.

It is recalled that there is currently designated under the same modems, modulators-demodulators which comprise:
a modulator which converts a random succession of binary signals equal to 0 or 1 into a periodic analog signal, modulated in frequency, in amplitude or in phase, and transmittable by means of the telephone network;
a demodulator which converts the modulated analog signal supplied by the network into a succession of 0 or 1.

The present invention relates to frequency-modulation modems which are known under the English name of Frequency Shift Keying or FSK.

In FSK modems, the modulator causes a sine curve at frequency $F_A$ to correspond to a zero and the modulator causes a sine curve of frequency $F_Z$ to correspond to a one.

The specifications of the CCITT lay down all the characteristics of the modems, thus a 1200-baud modem has been studied for which $F_A = 2100$ Hz and $F_Z = 1300$ Hz. This modem operates in duplix (i.e., using simultaneously the same line) with another 75-baud modem for which $F_A = 450$ Hz and $F_Z = 390$ Hz.

The 1200-baud modem will be cited by way of example in what follows.

In the prior art demodulators for frequency-modulation modems have first a chopper for the sinusoidal signal received from the telephone line followed by a shift register which imposes a delay $\tau$ and a device which ensures multiplication between the signal coming directly from the chopper and this same signal delayed by $\tau$.

The delay $\tau$ is chosen so that: $\omega_c \cdot \tau = \pi/2$ with $\omega_c$ defined as follows: $\omega_c = 2\pi \cdot F_C$ with $f_o = (F_A - F_Z)/2$ and $F_C = F_{A-fo}$.

Thus, at the output of the multiplication device, the signals at $F_A$ and $F_Z$ are superimposed on DC voltages which are equal but of opposite signs and it is easy to detect them and to transform the analog signal received from the line into a succession of 0 and 1.

For $F_A = 2100$ Hz and $F_Z = 1300$ Hz, the frequency $F_C$ equals 1700 Hz and $\tau$ equals 150 $\mu$s.

SUMMARY OF THE INVENTION

The present invention relates to a demodulator for a frequency-modulation modem which differs in its operating principle and its practical construction from the demodulators of the prior art.

This demodulator comprises two parallel channels over which is sent simultaneously the signal to be demodulated. Each channel is formed by:
two transverse parallel filters which comprise a shift register with $n+1$ stages and which form the convolution between the input signal of the sampled filter and the pulse response of the filter defined by the weighting coefficients $h_k$. The weighting coefficients $h_k$ of the two filters are functions of the product $\omega p \tau$, a given function called $f_R(\omega p \tau)$ being the weighting coefficient of one of the filters and another given function called $f_I(\omega p \tau)$ being the weighting coefficient of the other filter, with:
for one of the channels $\omega = \omega_A = 2\pi F_A$ and for the other channel $\omega = \omega_Z = 2\pi F_Z$;
$\tau$, the delay with which the shifting of one sample takes place from one stage of the register to the next;
p = 1 to n, such that $n\tau$ is limited to the duration of the band of the modem;
with, for $\omega_A$ or $\omega_Z$ depending on the channel, the maximum of $f_R(\omega p \tau)$ equal to that of $f_I(\omega p \tau)$ and a phase shift of $\pi/2$ between $f_R$ and $f_I$; and
a device for squaring or taking the modulus of the signal coming from each filter.

The demodulator of the invention presents numerous advantages among which may be cited:
its simplicity of construction;
its great ease of integration particularly in the case where the filters are charge-transfer filters;
its high performances.

DESCRIPTION OF THE DRAWINGS

Other objects, charcteristics and results of the invention will be clear from the following description, given by way of nonlimiting example and illustrated by the accompanying drawings in which.

In the different figures, the same references designate the same elements but, for the sake of clarity, the sizes and proportions of the different elements are not respected.

DESCRIPTION OF THE PREFERRED EMBODIMENT

Figure 1:
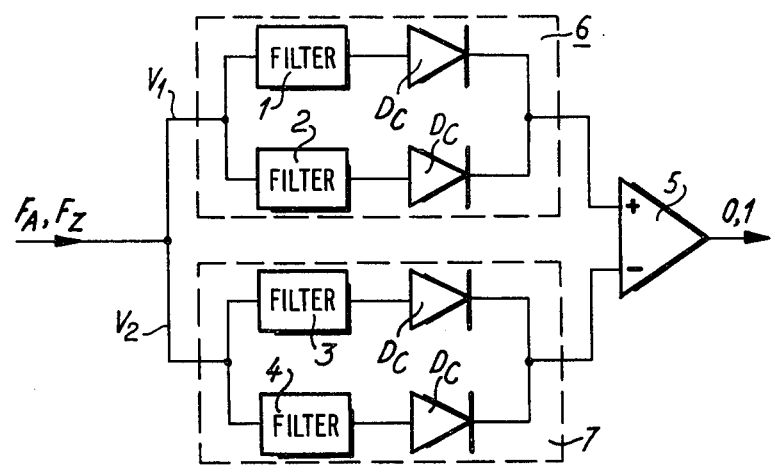
FIGS. 1 and 2 show two embodiments of the demodulator of the invention.

FIG. 1 shows the diagram of a demodulator in accordance with the invention.

The demodulator of the invention comprises two parallel channels $V_1$ and $V_2$ over which is fed simultaneously the signal to be demodulated which is formed of sine curves at two different frequences of $F_A$ and $F_Z$.

In each channel, there are two parallel filters which are referenced 1 and 2 for channel $V_1$ and 3 and 4 for channel $V_2$. A device $D_C$ ensures squaring or takes the modulus of the signal coming from each filter. This device may be constituted from diodes and the device $D_C$ is shown symbolically by a diode in FIG. 1.

A differential amplifier 5 receives at its positive input the signal coming from channel $V_1$ and at its negative input the signal coming from channel $V_2$. The differential amplifier 5 provides at its output two types of positive or negative signals which enable the input signal at frequency $F_A$ or at frequency $F_Z$ to be detected and thus 0 or 1 to be transmitted.

In each channel $V_1$ and $V_2$ the amplitude of the discrete Fourier transform of the signal to be demodulated is calculated, at frequency $F_A$ for channel $V_1$ for example, and at frequency $F_Z$ for channel $V_2$.

When the signal to be demodulated is at frequency $F_A$, channel $V_1$ supplies the amplitude of the discrete Fourier transform at $F_A$ and channel $V_2$ only supplies a low-amplitude noise signal. The differential amplifier 5 then detects that a sine curve at frequency $F_A$ has been transmitted to the input of the demodulator and a zero is sent at the output.

When the signal to be demodulated is at frequency $F_Z$, channel $V_2$ supplies the amplitude of the discrete Fourier transform at $F_Z$. The frequency $F_Z$ is then detected and a 1 is sent at the output of the amplifier 5.

It is recalled that the Fourier transform $H(\omega)$ of a signal as a function of the time f(t) is written:

$$H(\omega) \int_{-\infty}^{+\infty} f(t)e^{j\omega t}dt$$

with $$e^{j\omega t} = \cos \omega t + j \sin \omega t,$$

which can be written:

$$H(\omega) = \int_{-\infty}^{+\infty} f(t) \cos\omega t \, dt + j \int_{-\infty}^{+\infty} f(t) \sin\omega t \, dt.$$

Moreover, the discrete Fourier transform of f (t) is written:

$$H(\omega) = \sum_{p=1}^{n} f(p\tau) \cdot \cos(\omega p\tau) + j \sum_{p=1}^{n} f(p\tau) \cdot \sin(\omega p\tau). \quad (1)$$

In the demodulator of the invention, there is calculated in channel $V_1$ the amplitude of the discrete Fourier transform at frequency $F_A$ and in the channel $V_2$ the amplitude of the discrete Fourier transform at frequency $F_Z$, using in each channel two transverse parallel filters which form the convolution between the samples input signal $f(p\tau)$ and the pulse response of the filter defined by its weighting coefficients $h_k$.

So, for the two transverse filters 1 and 2 and 3 and 4 used in each channel, cos ($\omega p\tau$) weighting coefficients are chosen for one of the filters and sin ($\omega p\tau$) weighting coefficients for the other filter, with $\omega = \omega_A = 2\pi F_A$ or with $\omega = \omega_Z = 2\pi F_Z$ depending on the channel $V_1$ or $V_2$.

These transverse filters comprise a multistage shift register and the delay with which shifting of one sample of the input signal takes place from one stage of the register to the next is called $\tau$.

Furthermore, the time $n\tau$ during which samples of the input signal are taken is limited to the duration of the baud of the modem which comprises this demodulator.

It should be remembered that it is not permitted to transmit over the line two successive transitions separated by a period less than that of a baud.

If we have a k-baud modem, the value of the baud is equal to $1/K$. Thus in the case of a 1200-baud modem, it is not permitted to transmit over the line two successive transitions separated by less than 1 baud $= 1/1200 = 833$ $\mu$s.

By limiting the time $n\tau$ to the period of a baud, the risk of taking samples of the signal to be demodulated at two different frequencies $F_A$ and $F_Z$ is reduced to the maximum.

The discrete Fourier transform of f(t) (1) is in the form A +jB. Thus the amplitude $A^2+B^2$ of the discrete filter 1, 2, 3, 4 with a device $D_C$ which squares the signal coming from the filter. It is also possible to take the modulus of the signals coming from filters 1, 2, 3 and 4.

Figure 2:
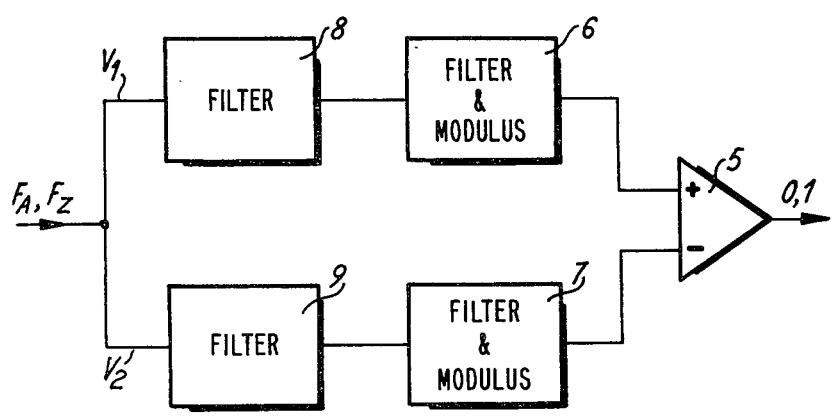

FIG. 2 shoes another embodiment of the demodulator of the invention.

In this embodiment, there is in each channel $V_1$ and $V_2$, preceding the devices 6 and 7 formed respectively from filters 1 and 2 and filters 3 and 4 associated with devices $D_C$, a filter 8 for channel $V_1$ and a filter 9 for channel $V_2$.

Filters 8 and 9, like filters 1, 2, 3 and 4 are transverse filters which form the convolution between their samples input signal and their pulse response defined by the weighting coefficients of each filter. Filters 8 and 9 present the particular characteristic of having a zero at frequency $F_Z$ for filter 8 which is in channel $V_1$ and a zero at frequency $F_A$ for filter 9 which is in channel $V_2$.

That means that the z transform of the output signal of these filters is cancelled out for the value which z assumes at $F_Z$ for filter 8 and is cancelled out for the value which z assumes at $F_A$ for filter 9.

At the output of filter 8, the frequency $F_Z$ is eliminated and device 6 selects the frequency $F_A$. Similarly, at the output of filter 9, the frequency $F_A$ is eliminated and device 7 selects the frequency $F_Z$. It is also possible to adapt the filters 1, 2, 3, 4, so that the filters 1 and 2 present a zero at $F_Z$ and the filters 3 and 4 present a zero at $F_A$.

Figure 3:
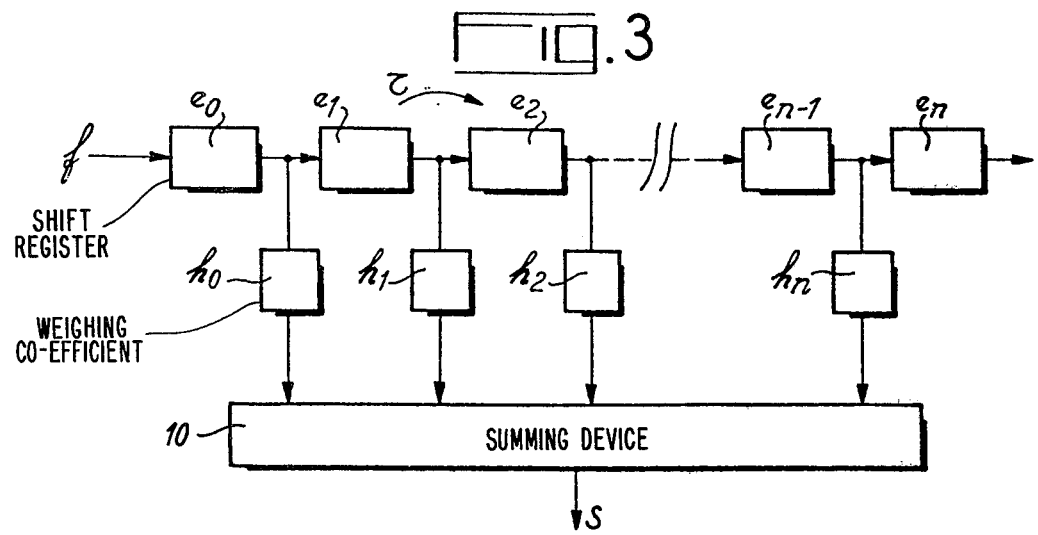
FIGS. 3 and 4 show a transverse filter and a charge-transfer transverse filter able to be used in the demodulator of the invention.
Figure 4:
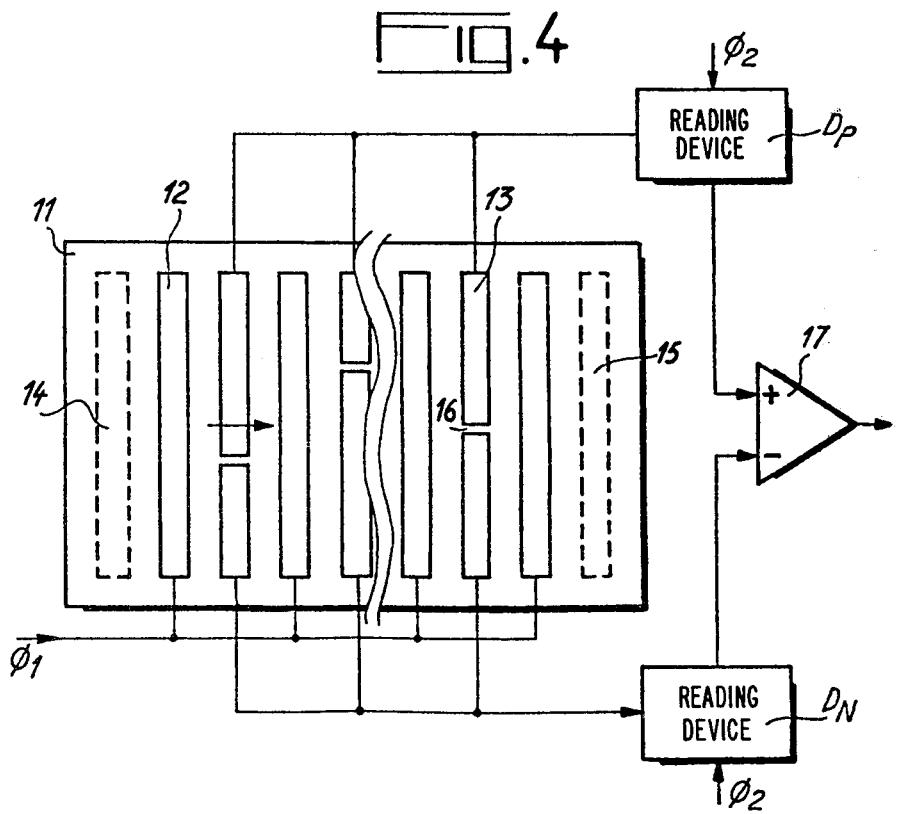

FIGS. 3 and 4 show the simplified diagram of a transverse filter and a charge-transfer transverse filter able to be used in the demodulators of the invention.

The filter shown in FIG. 3 comprises a shift register form from $n+1$ stages $e_o$ to $e_n$. The filter receives a sampled input signal f(t). The shifting of one sample of the input signal from one stage of the register to the next takes place with a delay $\tau$. The output signal of filter S is formed by the sum, provided by a summing device 10 at the same moment t, of the signals taken from each stage and to which is assigned a weighting coefficient $h_o, h_1, h_2 \ldots h_k \ldots h_n$. So the output signal S is equal to:

$$S = \sum_{p=1}^{n} f(p\tau) \cdot h_p.$$

This transverse filter may be a digital filter or a charge-transfer filter.

In the case of the digital filter, there is entered in a shift register at a frequency $1/\tau$, the digitally coded value of samples of the input signal. Each sample passes from one stage of the register to the next at a frequency $1/\tau$. $n+1$ multiplications are carried out between the contents of each stage and a weighting $h_o \ldots h_n$ contained in a memory. The sum of the result of these $n+1$ multiplications gives in digital form the filtered signal.

FIG. 4 shows the diagram of a charge-transfer filter of the CCD type (Charge Coupled Device), but charge-transverse filters of the BBD type (Bucket Brigade Device) may also be used.

Charge-transfer filters, which are well-known in the prior art, are formed from a semiconductor substrate coated with an insulating layer 11 on which alternate transfer electrodes 12 and charge-sorting electrodes 13 disposed perpendicularly to the transfer direction of the charges shown by an arrow.

At both ends of the device, two diodes 14 and 15 ensure respectively the injection into the substrate of electric charges, which are the minority carriers of the substrate, and the removal of these charges.

On application to the transfer and storage electrodes of clock signals $\phi_1$ and $\phi_2$, having the same period but in phase opposition, there is a transfer of charges from one storage electrode to the next one.

So that there is continuity of the potentials created in the semiconductor substrate under the electrodes and for there to be a single charge-transfer direction, the storage electrodes are disposed on an insulating thickened portion.

This insulating thickened portion may be replaced by overdoping of the substrate by implantation of ions which ensure the same functions.

Similarly, the description is made in the case of charge-transfer devices with two phases $\phi_1$ and $\phi_2$, but the invention also applies to three-phase charge-transfer devices for example which comprises two charge-transfer electrodes, between each storage electrode.

The storage electrodes 13 are separated into at least two parts by a cut 16 disposed in the direction of the charge transfer.

When charges arrive under a storage electrode, the charges stored under each part of this electrode are read by a charge-reading device $D_P$ and $D_N$, as is shown in FIG. 4.

The charge-reading devices $D_P$ and $D_N$ are connected to a differential amplifier 17 which allows a positively or negatively weighted signal to be obtained depending on the position of cut 16.

The current or voltage charge-reading devices are well-known in the prior art, particularly from the French patent application No. 2.389.899 in the name of THOMSON-CSF.

The transverse charge-transfer filters comprise then a shift register formed from transfer electrodes 12 and storage electrodes 13.

Each stage of this register comprises a storage electrode 13 separated into two parts by a cut 16 and one or more transfer electrodes 12.

In the case of the embodiment of the demodulator of the invention shown in FIG. 2 where the weighting coefficients cos $(\omega p\tau)$ for one of the filters 1, 2, 3 and 4 of each channel and sin $(\omega p\tau)$ for the other filter, zeros must be added to the z transfer function of filters 8 and 9 so as to eliminate the high frequencies.

Furthermore, it is possible to obtain the amplitude of the discrete Fourier transform at frequencies $F_A$ and $F_Z$ otherwise than by using filters having cos $(\omega p\tau)$ and sin $(\omega p\tau)$ weighting coefficients.

It is in fact sufficient for the weighting coefficients of filters 1 and 2 and 3 and 4 of each channel to be functions of the product $\omega p\tau$, i.e., $f_R(\omega p\tau)$ and $f_I(\omega p\tau)$, with for $\omega_A$ or $\omega_Z$ depending on the channel:

a phase shift of $\pi/2$ between $f_R$ and $f_I$;

the maximum of $f_R(\omega p\tau)$ equal to that of $f_I(\omega p\tau)$.

In a first solution, to obtain the phase shift of $\pi/2$ between $f_R$ and $f_I$, the weighting coefficients of the two filters of each channel are established by choosing any z transfer function P(z) for one of the filters and by taking as transfer function of the other filter of channel P(z) $(1-z)$.

Finally, the weighting coefficients are standardized so that the maximums are equal.

In a second solution, the weighting coefficients of the two filters of each channel are obtained by taking for one of the filters a z transfer function, P(z) which comprises symmetrical weighting coefficients, putting aside the central coefficient if the number of coefficients is uneven, as it is known so that the filter has a constant group time as a function of the frequency. The other filter of the same channel has a z transfer function, Q(z) $(1-z)$, where Q(z) is a z transfer function which comprises the same number of weighting coefficients as P(z), these coefficients are symmetrical putting aside the central coefficient if the number of coefficients is uneven and different from the coefficients of P(z).

In this case also, the weighting coefficients of the two filters of each channel are standardized so that the maximums are equal. To construct filters, 1, 2, 3, 4 it is advantageous to limit to 3 the number of storage electrodes of one of the filters of each channel, the filters 1 and 3 for example. In this case, the other filter of each channel comprises 4 storage electrodes whose cuts are positioned depending on the result of the multiplication by $(1-z)$ of the transfer function of filters 1 and 3 or of another three-coefficient transfer function as was seen previously. The accuracy obtained with this limited number of storage diodes is sufficient. The silicon area is reduced and the speed of transition is increased.

So, for example, in the case where the filters 1 and 2 present a zero at $F_Z$ and where the filters 3 and 4 present a zero at $F_A$, the following z transfer function is chosen for the filter 1, where $F_H$ is the clock frequency of the charge transfer filters:

$$1 - 2\cos\left(2\pi \cdot \frac{F_Z}{F_H}\right) \cdot z + z^2$$

The filter 2 has then the following z transfer function:

$$\left|\left(1 - 2\cos\left(2\pi \cdot \frac{F_Z}{F_H}\right) \cdot z + z^2\right) \cdot (1-z) \cdot Q\right|$$

and the constant Q is such that:

$$|1 - 2 \cdot \cos[2\pi \cdot (F_Z/F_H)] \cdot e^{-j2\pi(F_A/F_H)} + e^{-2j2\pi(F_A/F_H)}| =$$

$$|1 - 2 \cdot \cos[2\pi \cdot (F_Z/F_H)] \cdot e^{-j2\pi(F_A/F_H)} + e^{-2j2\pi(F_A/F_H)}| \cdot$$

$$|1 - e^{-j2\pi(F_A/F_H)}| \cdot Q$$

Concerning the filters 3 and 3, the following n transfer function is chosen:

$$1 - 2\cos\left(2\pi \cdot \frac{F_A}{F_H}\right) \cdot z + z^2$$

The filter 4 has then a transfer function equal to that of the filter 3 multiplied by $(1-z)$. Q, the constant Q' being chosen so that the outputs of filters 3 and 4 have the same amplitude at $F_Z$.

For the delay due to filters 1 and 2 (or 3 and 4) to be identical, these filters may be constructed on the same semiconductor substrate by intercalating their storage electrodes and by beginning with an electrode of the filter having the greatest number of storage electrodes. A reading device is then used adapted to the electrodes of each filter but a single charge injector and a single device for voltage conversion of the charges. The transfer from one storage electrode to the next must also take place twice as fast as when the filters are formed on separate substrates.

It would similarly be possible to sandwich on the same substrate the electrodes of the four filters 1, 2, 3 and 4.

The device shown in FIG. 2 may also be used as a frequency discriminator.

I claim:

1. A FSK demodulator for a frequency-modulation modem, this modem being formed from a modulator ensuring the conversion of a succession of binary signals equal to 0 or to 1 into a periodic analog signal at two different frequencies, $F_A$ and $F_Z$, and a demodulator ensuring the conversion of the analog signal at two frequencies $F_A$ and $F_Z$, into a succession of 0 and 1, wherein the demodulator comprises (a) two parallel channels over which there is simultaneously sent a sine curve analog signal to be demodulated, each channel being formed by:

(i) two parallel transverse filters which comprise an $n+1$ stage shift register and which form the convolution between the input signal of the sampled filter and the pulse response of the filter defined by its weighting coefficients $h_k$, the weighting coefficients of the two filters being functions of the product $\omega p\tau$, a given function $f_R(\omega p\tau)$ being the weighting coefficient of one of the filters, and another given function $f_I(\omega p\tau)$ being the weighting coefficient of the other filter with:

for one of the channels $\omega = W_A = 2\pi F_A$ and for the other channel $\omega = W_Z = 2\pi F_Z$; and in which $\tau$, is the delay with which the shifting of a sample takes place from one stage of the register to the next;

p is varying from 1 to n and n$\tau$ such that n is limited to the duration of the baud of the modem; and with $W_A$ and $W_Z$ depending on the channel, the maximum of $f_R(\omega p\tau)$ equal to that of $f_I(\omega p\tau)$ and with a phase shift of $\pi/2$ between $f_R$ and $F_I$; and (ii) a device ensuring the squaring of the signal from each filter; and (b) a differential amplifier receiving the signal from the two channels and supplying the output signal of the demodulator.

2. A FSK demodulator for a frequency-modulation modem, this modem being formed from a modulator ensuring the conversion of a succession of binary signals equal to 0 or to 1 into a periodic analog signal at two different frequencies, $F_A$ and $F_Z$, and a demodulator ensuring the conversion of the analog signal at two frequencies, $F_A$ and $F_Z$, into a succession of 0 and 1, wherein the demodulator comprises (a) two parallel channels over which there is simultaneously sent a sine curve analog signal to be demodulated, each channel being formed by:

(i) two parallel transverse filters which comprise an $n+1$ stage shift register and which form the convolution between the input signal of the sampled filter and the pulse response of the filter defined by its weighting coefficients $h_k$, the weighting coefficient of the two filters being functions of the product $\omega p\tau$, a given function $f_R(\omega p\tau)$ being the weighting coefficient of one of the filters and another given function $F_I(\omega p\tau)$ being the weighting coefficient of the other filter with:

for one of the channels $\omega = W_A = 2F_A$ and for the other channel $\omega = W_Z = 2F_Z$; and in which $\tau$, is the delay with which the shifting of a sample takes place from one stage of the register to the next;

p is varying from 1 to n and n$\tau$ such that n is limited to the duration of the baud of the modem; and with $W_A$ and $W_Z$ depending on the channel, the maximum of $f_R(\omega p\tau)$ equal to that of $f_I(\omega p\tau)$ and with a phase shift of $\pi/2$ between $f_R$ and $F_I$; and (ii) a device ensuring taking the modulus of the signal from each filter; and (b) a differential amplifier receiving the signal from the two channels and supplying the output signal of the demodulator.

3. The demodulator as claimed in claim 1 or 2, wherein $f_R(\omega p\tau)$ and $f_I(\omega p\tau)$ are cosin and sin functions.

4. The demodulator as claimed in claim 1 or 2, wherein the weighting coefficients of the two filters of each channel are obtained by choosing any z transfer function $P(z)$ for one of the filters and by taking as transfer function for the other filter of the channel $P(z)(1-z)$.

5. The demodulator as claimed in claim 1 or 2, wherein the weighting coefficients of the two filters of each channel are obtained by choosing for one of the filters a z transfer function, $P(z)$, which comprises symmetrical weighting coefficients except when it comprises a central coefficient if it exists and by choosing for the other filters of the same channel a z transfer function, $Q(z)(1-z)$, where $Q(z)$ is a z transfer function comprising the same number of coefficients as $P(z)$, also symmetrical and different from the $P(z)$ coefficients.

6. The demodulator as claimed claim 4, wherein the weighting coefficients of the two filters of each channel are standardized so that their maximums, at frequencies $F_A$ or $F_Z$ depending on the channel, are equal.

7. The demodulator as claimed in claim 1 or 2, wherein the transverse filters are charge-transfer transverse filters.

8. The demodulator as claimed in claim 5 wherein the weighting coefficients of the two filters of each channel are standardized so that their maximums, at frequencies $F_A$ or $F_Z$ depending on the channel, are equal.

9. The demodulator as claimed in claim 1 or 2, wherein each channel comprises a third transverse filter which forms the convolution between its sampled input signal and the pulse reply of the filter defined by its weighting coefficients and which is placed in front of said two parallel filters, each third filter having a zero at frequency $F_A$ for the channel where $\omega = \omega_z$ and at frequency $F_A$ for the channel $\omega = \omega_A$ and also comprising zeros intended to eliminate the high frequencies.

10. The demodulator as claimed in claim 1 or 2, wherein the two parallel filters of each channel have a zero at frequency $F_A$ for the channel where $\omega = \omega_z$ and a zero at frequency $F_Z$ for the channel where $\omega = \omega_A$.

11. The demodulator as claimed in claim 1 or 2 wherein two filters of each channel are formed on the same semiconductor substrate, said two filters having storage electrodes, said storage electrodes of said two filters being intercalated on said substrate.

* * * * *